March 14, 1967     E. A. SCHULTZ     3,309,562
SEMI-CONTINUOUS ALERT LIGHTS FOR MOTOR VEHICLES
Filed Dec. 17, 1964

INVENTOR.
ELMER A. SCHULTZ

United States Patent Office 3,309,562
Patented Mar. 14, 1967

3,309,562
SEMI-CONTINUOUS ALERT LIGHTS FOR
MOTOR VEHICLES
Elmer A. Schultz, 1405 N. 21st St.,
Council Bluffs, Iowa 51501
Filed Dec. 17, 1964, Ser. No. 419,036
3 Claims. (Cl. 315—77)

This invention relates to blinking alert lights for automobiles and more particularly it is an object of this invention to make blinking alert lights practical through my concept of a way to avoid confusion between continuously operating blinking alert lights operating at the same time as blinking turn signals.

Throughout the history of the alert light art various proposals have been made for the use of blinking alert lights on automobiles, sometimes continuously operating.

Such alert lights never been popularized to the extent of instalaltion on new automobiles in mass production. This in my opinion is a tragedy because of the many deaths occurring from highway accidents that could have been avoided by alert lights.

A particularly dangerous time for highway accidents is in the "half-dash light" at dawn and dusk and it is my conviction that many injured persons would not be injured today if alert lights had been practical and available on their automobiles.

However, the practicality of alert lights has not heretofore been attained. The problem that has eluded solution, in my opinion, is the confusion between blinking turn signal lights and a simultaneously blinking alert light, as is a considerable problem and disadvantage indeed.

It has always been a possibility for an operator to throw a switch to shut off an alert light at times when he is using his turn signal light. However, this possibility has not solved the problem, because it is human nature not to bother with excessive motions and also to fail through human error in carrying out any operation that does not present its immediate urgency to the driver.

Alert lights on an automobile are set in positions to be seen by other motorists and not by the driver of the automobile himself. For this reason the driver is not presented at the occasion of each turning of his car with the necessity for throwing off and then later throwing on again a switch for a blinking alert light.

My solution to this problem is to provide means automatically shutting off an otherwise preferably continuously operating blinking alert light whenever the turn signal lights are turned on. This automatic operation solves the various problems and may influence the automobile manufacturers to install safety blinking alert lights as original equipment.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
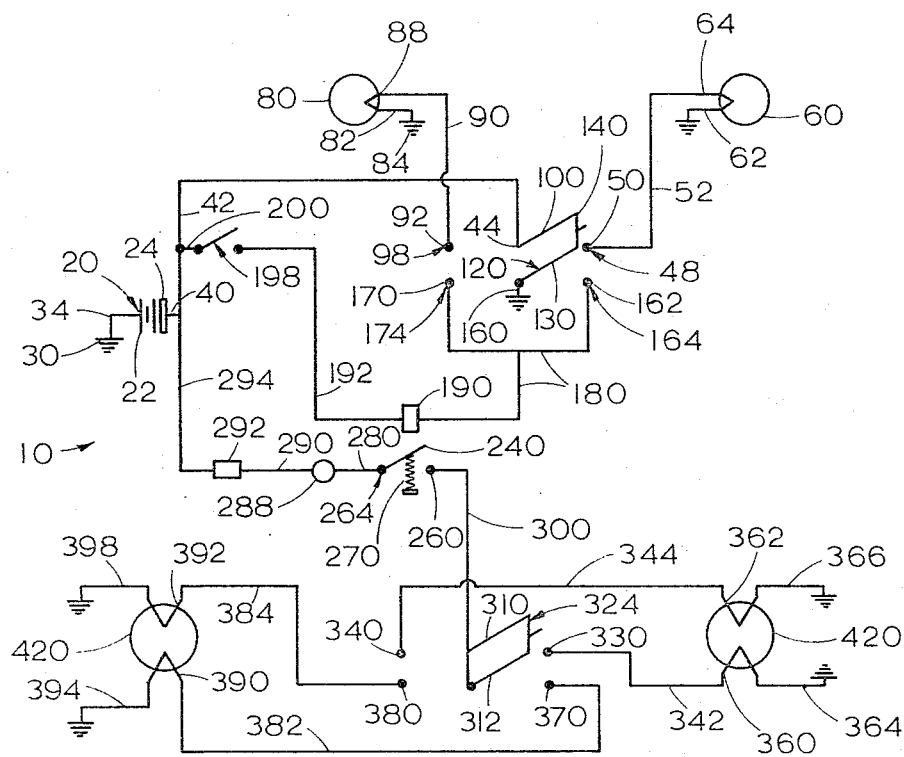
FIGURE 1 is a diagrammatic view of the alternate alert light and turn light system of this invention.
Figure 2:
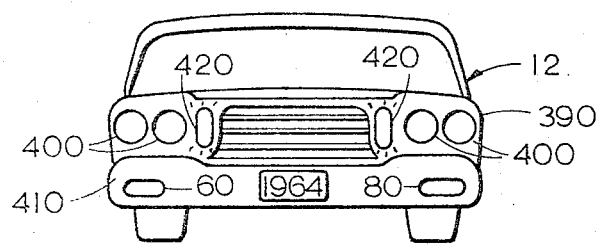
FIGURE 2 is a view showing the forward side of an automobile with the alert lights installed thereon.

The alternate alert light and turn light system of this invention is generally indicated at 10 in FIGURE 1 and is adapted to be installed on an automobile, generally indicated at 12 in FIGURE 2, the term automobile being used in the broad sense to cover any highway traveling vehicle.

The automobile 12 has a source of power defined by a battery-voltage regulator assembly 20 of conventional type, having a battery 22 and a voltage regulator 24 the assembly 20 having one terminal connected to the ground 30 by a wire 34, and has another terminal connected by a wire 40 to a wire 42 leading to the terminal 44 of a turn light switch 48, the other terminal 50 of the switch 48 being connected by a wire 52. A conventional turn light is shown at 60 having one terminal grounded at 62 for connection to the power source 20 by being grounded, the turn signal 60 being a right turn signal and having its other terminal 64 connected to the wire 52. The switch 48 therefore defines a right turn light switch.

A left turn light 80 of the automobile 12 has one terminal 82 connected to a ground 84 for gaining connection to the power source 20 and has another terminal 88 connected by a wire 90 to a terminal 92 of a left turn switch generally indicated at 98 which uses the same switch throw 100 as the right turn light switch 48 whereby the switches 48 and 98 combine to be a single-pole double-throw switch which is a part of a double-pole double-throw switch generally indicated at 120, having a second throw 130 connected to the throw 100 by an insulated connection member 140 for a mechanical conneciton whereby the throw 100 and 130 are simultaneously thrown.

It is to be understood that the switch 48 and the switch 98 are conventional switches for turn lights now in use on automobiles.

The second throw 130 is grounded at 160 and the second throw 130 is adapted to engage terminal 162 for throwing a switch generally indicated at 164 at times when the throw 100 engages the terminal 50.

Conversely, the throw 130 engages the terminal 170 for closing a switch 174 at times when the throw 100 is in engagement with the terminal 92.

Wires 180 connect the terminals 170 and 162 with one terminal of a solenoid 190 which has its other terminal connected to a wire 192 through the ignition switch 198 and a wire 200 to the wire 42, which because of its connection to the wire 140, is thereby connected through the voltage regulator 24 to the battery 22.

As thus described, it will be seen that when each one of the turn lights 60 or 80 is on, then if the ignition switch 198 is closed, the solenoid 190 will be energized to pull a switch throw 240 away from the terminal 260 to open a switch 264 against the operation of a spring diagrammatically shown at 270. The switch 264 has one terminal connected by a wire 280 to a blinker or flasher unit 288 which is connected to a wire 290 to a fuse 292, which latter has another terminal connected by a wire 294 to the wire 40 and thence to the voltage battery 20, whereby power through the switch 240 is broken whenever a turn light 60 or 80 is on.

The other terminal 260 of the switch 264 is connected by a wire 300 to each throw 310 and 312 of a second double-pole double-throw switch 324 which can also be called an alert light selector switch 324.

The throw 310 is adapted to engage a terminal 330 and 340 selectively which are connected by wires 342 and 344 to a low beam filament 360 or a high beam filament 362 respectively, the other side of each of said filaments being grounded by wires 364 and 366.

The throw 312 is adapted to engage a terminal 370 or 380 connected by wires 382 and 384 respectively to a left low beam filament 390 and left high beam filament 392 respectively.

Other terminals of filaments 390 and 392 are connected to ground wires 394 and 398.

Operation is as follows: During normal operation with the ignition switch 198 closed, spring 270 will maintain the switch 264 closed, whereby so long as the turn signals are not in use, alert lights will be operating, and will be blinking because of the flasher or blinker unit 288.

With the switch 324 thrown to the right, the low beam alert light filaments 360 and 390 will be used and with the switch thrown to the left, the high beam filaments 362 and 392 will operate. When the operator uses his turn signal to turn to the right or the left, this will cause the switch 120 to be closed in either of these directions energizing the solenoid 190 which thereby overcomes the spring 270 opening the switch 264 and cutting off a power from the alert lights.

Therefore, the alert lights will not be in operation while turning and there is no danger of confusion with the turning lights.

Referring to FIGURE 2, a diagrammatic view of the bumper and forward hood portions of an automobile is there shown showing conventional head lights at 400, conventional turn signal lights at 60 and 80 in the bumper 410 and special alert lights of this invention at 420.

As shown, the alert lights are purposely vertically elongated to distinguish from the turn lights 60 and 80.

Further distinction from the turn lights is achieved by placing the right and left alert lights respectively substantially horizontally spaced from the horizontal centers of the right and left turn lights 60 and 80.

A still further distinction is achieved by placing the alert lights 420 at a substantially vertical spacing from and preferably above the vertical centers of the turn lights 60 and 80.

Also, preferably, it is of advantage if the alert lights 420 are disposed on the same level with the head lights 400.

From the foregoing description, it is thought to be obvious that a semi-continuous alert light for motor vehicles constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:
1. An alternate alert light and turn light system for automobiles having turn lights comprising: a source of power, right and left turn lights, means connecting one terminal of each turn light to said power source, right and left turn light switches, means connecting the other terminals of each turn light to said power source through said switches respectively, a solenoid having a terminal connected to a terminal of said power source, two solenoid control switches each having a terminal connected to the other terminal of said power source and each having another terminal connected to said solenoid, means operatively correlating said turn signal switches and said solenoid control switches whereby when said turn signal switches are closed for operation of said turn lights said solenoid control switches are also closed for energizing said solenoid, at least one alert light having a terminal connected to said power source, an alert light shut-off switch, means urging said shut-off switch to be normally closed for normal operation of said alert light, means connecting the other terminal of said alert light to said source through said shut-off switch and said solenoid and said shut-off switch being operatively correlated for the opening of said shut-off switch when said solenoid is energized, and a blinker switch means in series with said alert light to cause said alert light to blink.

2. The combination of claim 1 in which said alert light is vertically elongated to an extent easily distinguishable from conventional round head lights, and also from horizontally elongated turn lights.

3. The combination of claim 1 in which said alert light is disposed on the forward end of an automobile of the type having right and left head lights and having right and left horizontally elongated turn lights, said alert light being disposed at a horizontal spacing from said head lights and at a vertical spacing from said turn lights.

References Cited by the Examiner

UNITED STATES PATENTS

| | | | |
|---|---|---|---|
| 2,724,102 | 11/1955 | Hollins | 340—81 |
| 2,807,795 | 9/1957 | Haber | 340—81 X |
| 2,932,814 | 4/1960 | Wilfert | 340—76 |
| 3,002,127 | 9/1961 | Grontkowski | 315—77 |
| 3,072,885 | 1/1963 | Gehlsen | 340—81 X |
| 3,128,448 | 4/1964 | Shumer | 340—87 |
| 3,185,961 | 5/1965 | Du Rocher | 340—81 |

JOHN W. HUCKERT, *Primary Examiner.*

D. O. KRAFT, *Assistant Examiner.*